A. M. VAN DOORN.
METHOD OF MAKING THERMOPHONES.
APPLICATION FILED MAR. 21, 1919.
1,338,888.
Patented May 4, 1920.
2 SHEETS—SHEET 1.
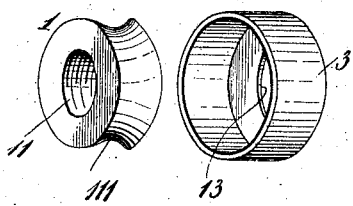
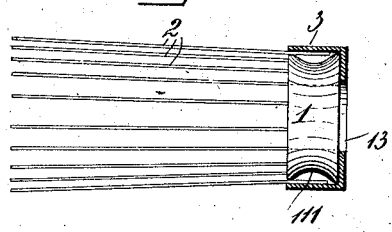
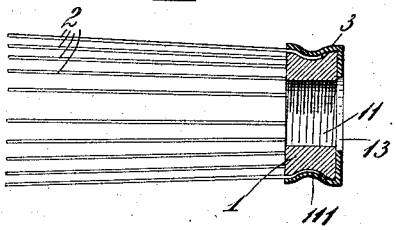
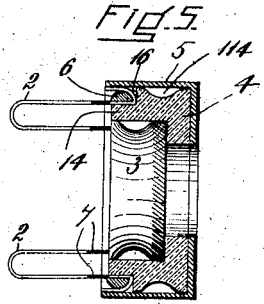
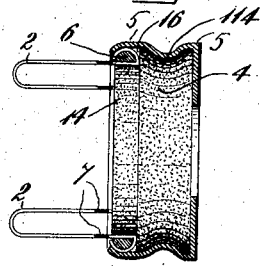
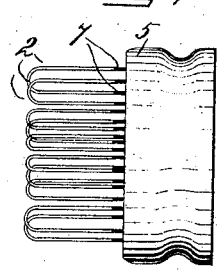
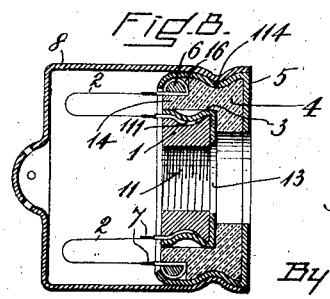

A. M. VAN DOORN.
METHOD OF MAKING THERMOPHONES.
APPLICATION FILED MAR. 21, 1919.

1,338,888.

Patented May 4, 1920.
2 SHEETS—SHEET 2.

INVENTOR:
Anthonius M. van Doorn

BY
ATTORNEYS

UNITED STATES PATENT OFFICE.

ANTHONIUS M. van DOORN, OF NEWTON, MASSACHUSETTS, ASSIGNOR, BY MESNE ASSIGNMENTS, TO AMERICAN THERMOPHONE COMPANY, OF BOSTON, MASSACHUSETTS, A CORPORATION OF MASSACHUSETTS.

METHOD OF MAKING THERMOPHONES.

1,338,888.        Specification of Letters Patent.       Patented May 4, 1920.

Application filed March 21, 1919. Serial No. 284,196.

*To all whom it may concern:*

Be it known that I, ANTHONIUS M. VAN DOORN, of Utrecht, in the Kingdom of Holland, a subject of Wilhelmina, Queen of the Netherlands, residing at Newton, Massachusetts, have invented a new and useful Improvement in Methods of Making Thermophones, of which the following is a specification.

A thermophone in the most practical form now known comprises a plurality of wires arranged to form loops each say $7\frac{1}{2}$ mm. long between their points of attachment to electrodes. These wires are made by the Wollaston process with a platinum core and a silver coating and drawn down to a diameter of 10 microns, the platinum core being about 2 microns in diameter. These loops are connected at each end to electrodes and are arranged in parallel as part of an electric circuit, the whole being covered by a suitable cap to form a resonating chamber within which compressional or sound waves may be utilized for conveying intelligence. Preferably the terminals to which these platinum wires are attached are annular, and the finished thermophone is approximately $\frac{1}{2}$ an inch in diameter and $\frac{3}{8}$ of an inch high. It is readily seen that the handling of platinum wires of such minute diameter would require almost impossible delicacy of touch unless stiffened in some coating which would add to their diameter and strength, and the making of wires of this character would be impracticable except for the use of the Wollaston process, that is, the coating of platinum wires of considerable strength with silver or other metallic coating which is sufficiently ductile to allow the compound wire to be drawn down to a proper size, in which case both the platinum and the silver are reduced proportionately with each drawing, the coating being of such material as may be etched off or otherwise removed in whole or in part.

In the making of the thermophone it has been suggested to embed the loop or pieces of Wollaston wire in a cast of wax or some other like material, leaving a loop or loops of the wire projecting, and then drop the cast and the loop as a whole into an acid wherein the loop or that portion of the wire which projects from the cast will be attacked and removed by the acid, the cast itself being of such material as is acid-resisting. The practical difficulty with this method lies in the fact that upon removing the cast, which is only large enough to hold the loop or loops, say about $\frac{3}{8}$ of an inch in diameter, and its loop or loops from the acid bath, a large drop or drops of the acid will adhere to the cast as well as to the loop, and in getting rid of these drops, the loop being of such delicate character will tend to be bent, crushed, crumpled or broken, and they will often bend with more or less irregularity and perhaps come in contact with each other either at that moment or later in the use of the device, thus causing short-circuiting, which will be practically fatal to the proper operation of the construction as a thermophone, perhaps burning out the conductor thus changing the resistance of the device or perhaps breaking the circuit entirely. This method, after laboratory experiments, cannot be relied upon to make thermophones in large numbers commercially.

Having these difficulties in mind and bearing also in mind the extreme fragility of the heat-conducting elements of the thermophone, I have devised a method of constructing such a thermophone which has proved exceedingly satisfactory, not only because the loops remain always in mechanically parallel relation with each other, that is, do not crumple or bend and hence do not tend to contact, but also because each loop can be made and etched to the same length as all the others so that, knowing the standard electrical resistance of the wire a large number of thermophones can be made having not only substantially the same resistance as a whole but also each loop of which is of substantially the same resistance as every other loop. It must be remembered that the difference of 1 millimeter in length in the etched portion of one loop of such a platinum wire makes a difference of 80 ohms in its resistance.

In the construction of the thermophone in accordance with my invention it is preferred that the electrodes, as I call the parts connected by the loops, be annular and arranged concentrically, and they are separated by some form of insulation such as bakelite, properly shaped, but this is immaterial so long as the concentric rings or other electrodes are electrically separated from each other.

The simplest and best method now known to me for making thermophones is as follows:—

The form of electrodes having been determined, for example, annular concentric pieces of brass, there is attached to one of the electrodes a series of straight Wollaston wires, each separate from the others and each parallel to all the others, these wires being preferably equally spaced apart and also preferably projecting an equal length from the electrode. These wires are bent to form loops and the attachment of their free ends is made to the second electrode, which is preferably larger in diameter than the first electrode and surrounds it concentrically. This bending is so done that all the loops are of the same length, that is, the wire composing each loop is exactly of the same length from its point of contact with one electrode to its point of contact with the other electrode, say $7\frac{1}{2}$ mm., the two electrodes being separated by means of an insulating ring, which lies between them and to which they are both mechanically attached, or in some other convenient way, it being insured that these rings shall be insulated from each other and the whole form a single structure.

The mechanical structure now being practically complete, to make the device an operative thermophone the loops must be dipped into an etching material such as say nitric or other acid, depending on the metal with which the platinum wire is coated, and this must be done in such a way as to insure the removal of an equal length of covering, say $5\frac{1}{2}$ mm., from the platinum wire of each loop in order that the resistance of each loop shall be that of every other loop. If this is not so, certain of the loops will carry more current than those of greater resistance and perhaps be heated to oxidizing temperature in which case they may break the circuit through them. Thus the balance of the device will be destroyed. And this dipping should be done in such a way that the acid or etching material or gas shall not touch the electrodes to which the loops are attached.

Preferably the loops should be so dipped that when the etching process is finished there shall project from the electrodes at the base of each loop very short lengths of wire, say 1 mm., which has been unetched. In order to insure this result, the base of each end of each loop may be given before dipping a slight coating of some kind of varnish or other material not attackable by the etching material.

After removal from the acid a suitable cap may be permanently attached to protect the loops and form a resonance chamber, and the device is complete. The electrodes may be attached to the circuit wires in any convenient way.

In practice, it is convenient first to attach the ends of straight wires to the first electrode and then even the length of all the wires by some cutting process, but this is not essential because the main desirability is to secure to the two electrodes a series of partially etched loops in parallel, the heat-conducting parts of each of which shall be of the same length as the rest in order that the resistance of each will equal the resistance of each of the others.

The various steps above described will be understood by reference to the drawings, in which—

Figure 1 shows two members of the device in perspective;

Fig. 2 illustrates partly in section and partly in elevation the first step in the method;

Fig. 3 is a section showing the second step;

Figure 9:
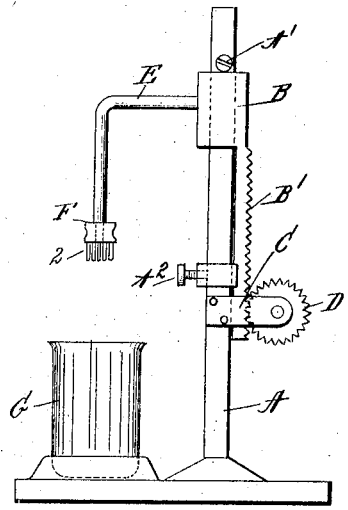
Figure 10:
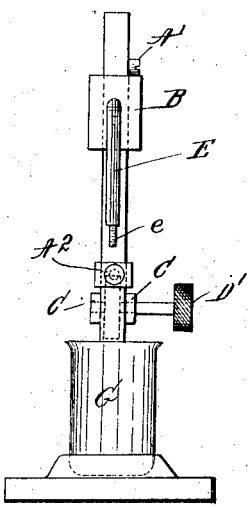

Fig. 4 showing in elevation the device of Fig. 3;

Figs. 5 and 6 are partial sections showing the next two steps in the method;

Fig. 7 is a side elevation of the device shown in Fig. 5;

Fig. 8 is a section of the finished thermophone;

Fig. 9 is a side elevation showing a dipping machine with a thermophone attached ready for dipping; and Fig. 10 is a front elevation of the same, the thermophone being removed.

It is evident that one skilled in the art may accomplish the desired results with elements other than those shown and yet be within the terms of the claims hereinafter made. As shown in the drawings, however, the thermophone illustrated in Fig. 8 is made up of a core or centerpiece 1, preferably with a threaded opening 11 through it, around the periphery of which wires 2 are spaced parallel with its axis, the number of wires being immaterial. A thimble 3 is then placed over the wires and the core 1 as shown in Fig. 2, this thimble also having an opening 13 registering with the opening 11 in the core. The wires 2 should ultimately be all of the same length and this may be accomplished either by cutting them the same length in the first place and then placing them in position about the core 1 or they may be drawn off from spools and their ends placed equally distant apart about the periphery of the core and at some period before they are bent, cut off so as to be of equal length.

In Figs. 3 and 4 the thimble is shown indented or spun into a groove 111 in the periphery of the core so as to clamp the wires tightly in place. In Fig. 5 an insulation piece 4 is shown applied about the indented thimble 3 and a second thimble or finishing piece 5 is placed upon the outside of the insulation piece 4. This insulation piece it will be noted has a shoulder 14 beyond which the second thimble 5 extends forming a cavity 16 in which lies a ring 6 which has been forced into it, driving the free ends of the bent wires 2 with it into the cavity and thereafter, as shown in Fig. 6, the second thimble 5 is bent to conform to the hollow 114 in the periphery of the insulation piece and its outer edge is turned over to confine the ring 6 and the contacting end of the wire 2 in the cavity 16. This forms a device substantially as shown in Fig. 7. Preferably at this point a portion of the surface of the two ends of each wire adjacent the electrodes is covered with some coating such as varnish, shown at 7, which will prevent the acid from crawling up the wires by capillary attraction.

The purpose being now to etch from the loops the silver which coats the platinum core, the device is placed upon the machine shown in Figs. 9 and 10. Here A is a standard carrying the two stops $A^1$ and $A^2$. On this standard slides a sleeve B one side of which is prolonged downwardly on the back of the machine to carry a rack $B^1$. C, C are two plates between which is pivoted the pinion D connected to a knurled handle $D^1$ to be operated thereby. The pinion engages with the rack $B^1$ so that by turning it the rack and sleeve may be raised or lowered. When raised it may be elevated to the point indicated by the stop $A^1$. When lowered its downward movement is limited by the stop $A^2$ which is adjustable. The sleeve B carries a bent arm E threaded at its lower end as at $e$ upon which is screwed the thermophone blank F, such as is shown in Fig. 7. G is a beaker to contain the etching fluid.

The beaker G being filled with acid to a proper height the stop $A^2$ is adjusted to allow the sleeve to move downward on the standard A a limited distance only so that a proper length of say $5\frac{1}{2}$ mm. of the loops of wire 2 will be immersed in the acid. As above described, it is important that all the loops be etched to the same extent, and it is also desirable that the acid have no opportunity to attack the electrodes or portions of the device to which the wires are attached, hence the necessity for preventing capillary attraction from causing the acid to work up above the level of the acid in the beaker to the wire holder or electrodes. The thermophone element being then removed and allowed to dry, the cap 8 is placed upon it and spun or crimped to conform to the periphery of the thimble 5, and the thermophone is ready for use. The shaping steps above referred to may well be carried on by machines for which patent applications have recently been filed by me, but it will be evident to one skilled in metal working that other machines and tools may be used. In view of the smallness of the parts of which it is made and the delicacy of the thermophone, both mechanically and electrically, when finished, it will be seen that its economical and commercial construction is attended by problems of considerable difficulty to secure uniform accuracy of result in the product of a day's work.

What I claim as my invention is:—

1. That method of forming a thermophone which comprises the attachment of a plurality of separate straight wires, all of substantially the same length, each having a removable metallic coating, to an electrode to occupy spaced parallel and permanent relationship to one another, cutting said wires to project a uniform distance from said electrode, bending said wires to form loops, attaching the free ends of said loops to a second electrode, electrically insulated from said first electrode whereby loops all of the same length will connect said electrodes, and then subjecting an equal portion of each of said loops to an etching process whereby an equal portion of the metallic coating on said loops will be removed therefrom and the substantially equal electrical resistance of all of said loops will be secured.

2. That method of forming a thermophone which consists in attaching one end of each of a plurality of wires to an electrode, then bending said wires into a plurality of loops and attaching the free end of each wire to a second electrode insulated from the first electrode to form a plurality of conductors, then dipping the tips of the loops into an etching material whereby an equal portion of the metallic coating on all said loops will be etched, and a plurality of loops of equal resistance will be made.

3. That method of forming a thermophone which consists in attaching one end of each of a plurality of wires to an electrode, then bending said wires to form a plurality of loops and attaching the free end of each wire to a second electrode insulated from the first electrode to form a plurality of conductors, then covering portions of each loop adjacent the electrode with an acid-resisting material whereby said portions and their junction with the electrode will be protected from acid, dipping the tips of the loops into an etching material whereby an equal portion of the metallic coating on all said loops will be etched, and a plurality of loops of equal resistance will be made.

4. That method of making a thermophone which consists first in binding one end of each of a number of Wollaston wires of equal length to an electrode, then binding the free end of each of said wires to a second electrode and insulating said electrodes from each other whereby a single structure is made and then dipping a predetermined length of all of said wires in an etching fluid whereby the Wollaston coating will be etched from a portion thereof and an equal portion of each wire will be exposed.

5. That method of making a thermophone which consists first in binding one end of each of a number of Wollaston wires to an electrode, then bending said wires to form loops, then binding the free ends of said wires to a second electrode, then insulating said electrodes from each other whereby a firm structure is made, then coating the ends of the loops close to the said electrodes with an acid-proof coating leaving exposed an equal length of said loops and finally dipping the loops to a predetermined length in an acid whereby the Wollaston coating will be etched from a portion of said wires and an equal portion of each loop will be exposed.

6. That method of making a thermophone which consists first in binding one end of each of a number of Wollaston wires to an electrode, then bending said wires to form loops, then attaching an insulator to said electrode, then attaching a second electrode to said insulator and then attaching the free ends of said loops to said second electrode, whereby a structure comprising loops of equal lengths will be formed and finally etching the coating from each of said loops for a predetermined length whereby the exposed portions of each loop will have an electrical resistance equal to the electrical resistance of each of the other loops.

7. A thermophone comprising two concentric electrodes having a concentric insulator between them, a plurality of Wollaston wire loops, means for connecting one end of each loop to one of said electrodes and the other end of each loop to the other electrode, said means comprising metal elements having rings adapted to engage the peripheries of said electrodes and bind the ends of said loops thereto, each of said loops having metal-coated ends and portions intermediate the ends from which the metal coating has been removed.

ANTHONIUS M. van DOORN.